United States Patent Office 3,365,663
Patented Jan. 23, 1968

3,365,663
THICKNESS MEASURING INSTRUMENT FOR ELECTRO-CONDUCTIVE OBJECTS AND ASSOCIATED METHODS
Tomio Yamaguchi, Kobe, Japan, assignor to Shin-Mitsubishi Jukogyo Kabushiki Kaisha, Tokyo, Japan
Filed June 26, 1963, Ser. No. 292,191
Claims priority, application Japan, June 29, 1962, 37/27,079
16 Claims. (Cl. 324—64)

This invention relates to thickness measuring instruments, and more particularly to instruments for the simplified measuring of the thickness of electro-conductive objects.

In conventional methods of measuring the thickness of a metal object by the use of an electric-resistance technique, known measuring instruments are constructed to transmit a predetermined D.C. current through a metal object and to measure the voltage drop arising between two points spaced at a predetermined distance by means of a D.C. voltmeter. It is then necessary to convert this voltage drop (potential difference) to thickness by means of a calibration curve. Thus, as in a known measuring instrument, it is necessary to read said potential difference from the scale of the measuring instrument and then to read the thickness values corresponding to these potential differences on a thickness calibration curve, much time and effort are wasted.

An object of the present invention is to provide an improved thickness measuring instrument for electro-conductive articles without such defects as mentioned above.

To this end, there is contemplated apparatus in which a pair of current contacts makes contact with an object to feed current thereto and a pair of voltage contacts also makes contact with the object to detect the potential difference between the latter, said potential difference being transmitted to a voltage indicating instrument through a variable resistance attenuator provided between the voltage contacts and the voltage indicator. Then, with the resistance value of the resistance attenuator being varied according to the specific resistance value of the measured object, the thickness value can be directly read by said indicating instrument.

Other objects and advantages are also effected by the invention as will be apparent from the following description which is illustrated in the accompanying drawing in which.

Figure 5:
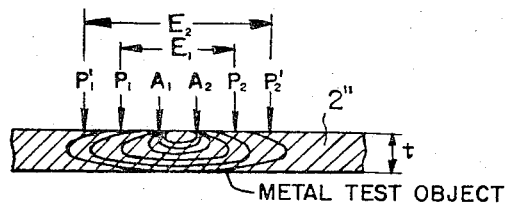
FIGURE 5 is a diagrammatic view of an arrangement for measuring thickness.

In the drawing, FIG. 5 is a front view of an arrangement for measuring thickness at a given zone in the object plate irrespective of the specific resistance value thereof. A pair of current contacts $A_1$ and $A_2$ in the center and two pairs of voltage contacts $P'_1$, $P_1$, $P_2$, $P'_2$ on the sides thereof constitute six contacts in all, which are spaced at equal distances on the object plate for contacting the same and feeding current thereto.

Figure 6:
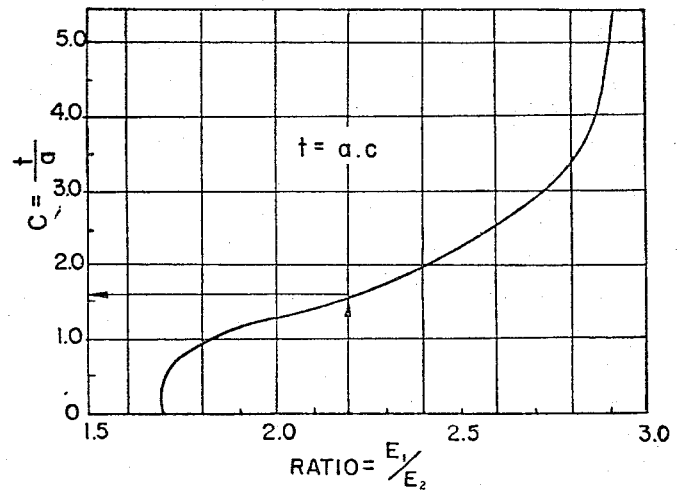
FIGURE 6 is a chart relating to FIG. 5.

FIG. 6 is a diagram showing a curve of the relationship of $E_1/E_2$, constituted by the ratio of the potential difference $E_1$ between $P_1$ and $P_2$ and the potential difference $E_2$ between $P'_1$ and $P'_2$ obtained for various object plates by employing the six contacts shown in FIG. 5 and by feeding current via the same, and $t/a$ from the values of the distance $a$ between each of the contacts and the thickness $t$.

Figure 1:
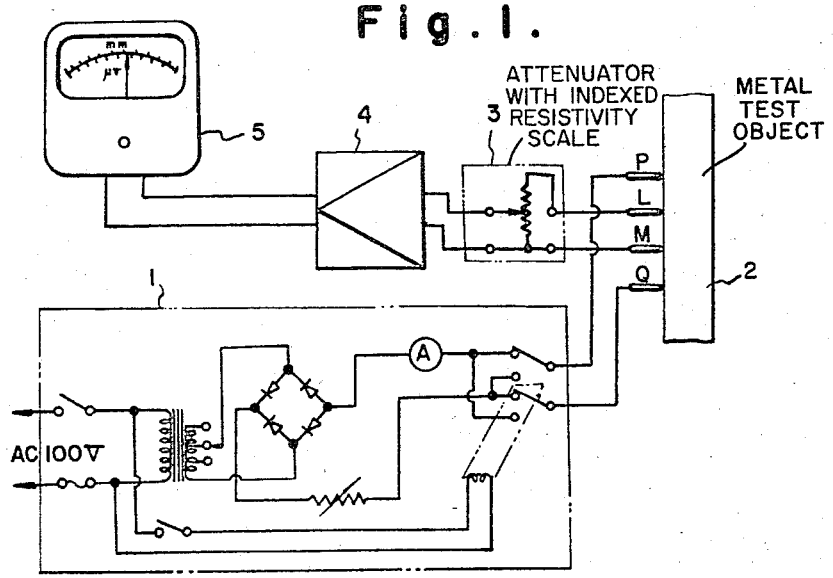
FIGURE 1 is a diagrammatic view of a thickness measuring instrument provided in accordance with a preferred embodiment of the present invention.

In FIG. 1, element 1 is a rectifier circuit effecting full-wave rectification of A.C. into D.C. Elements P and Q are current contacts functioning as a pair of contacts transmitting output current from circuit 1 to the plate or object 2, the thickness of which is to be measured.

There is further provided a pair of voltage contacts L and M equally spaced between said current contacts P and Q and also in contact with the object 2. The potential difference between voltage contacts L and M is conveyed to a variable resistance attenuator 3 and then, after being amplified by D.C. amplifier 4, is transmitted to indicator 5, whereat the thickness of the object 2 can be directly read on a scale as will be shown. The arrangement of the contacts may be altered as desired.

Figure 3:
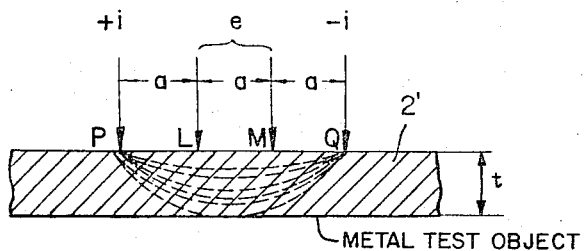
FIGURE 3 is a diagrammatic view of a pair of current contacts and a pair of voltage contacts provided between the current contacts, arranged in equally spaced relation, in contact with a plate which is to be measured.

Referring in detail to the principle of direct-reading as in the present instrument, when four contacts P, L, M and Q are equally spaced as shown in FIG. 3, and current $i$ is transmitted to the outermost current supplying or current contacts P and Q, and where the potential difference between the voltage measuring or voltage contacts L and M is $e$, then the relationship between $e$ and thickness $t$, when the measured object 2 is an endless planar plate, may be expressed by the following formula:

$$e = \frac{\rho i}{2\pi t} \{ f(\theta_1) - f(\theta_2) \} \tag{I}$$

In this formula, $\rho$=specific resistance value or resistivity of the measured object $$\theta_1 = \frac{a}{2t} \quad \theta_2 = \frac{a}{t}$$

$$f(\theta) = \frac{1}{\theta_1} + 2 \sum_{n=1}^{\infty} \frac{1}{\sqrt{\theta_i^2 + n^2}}$$

Figure 4:
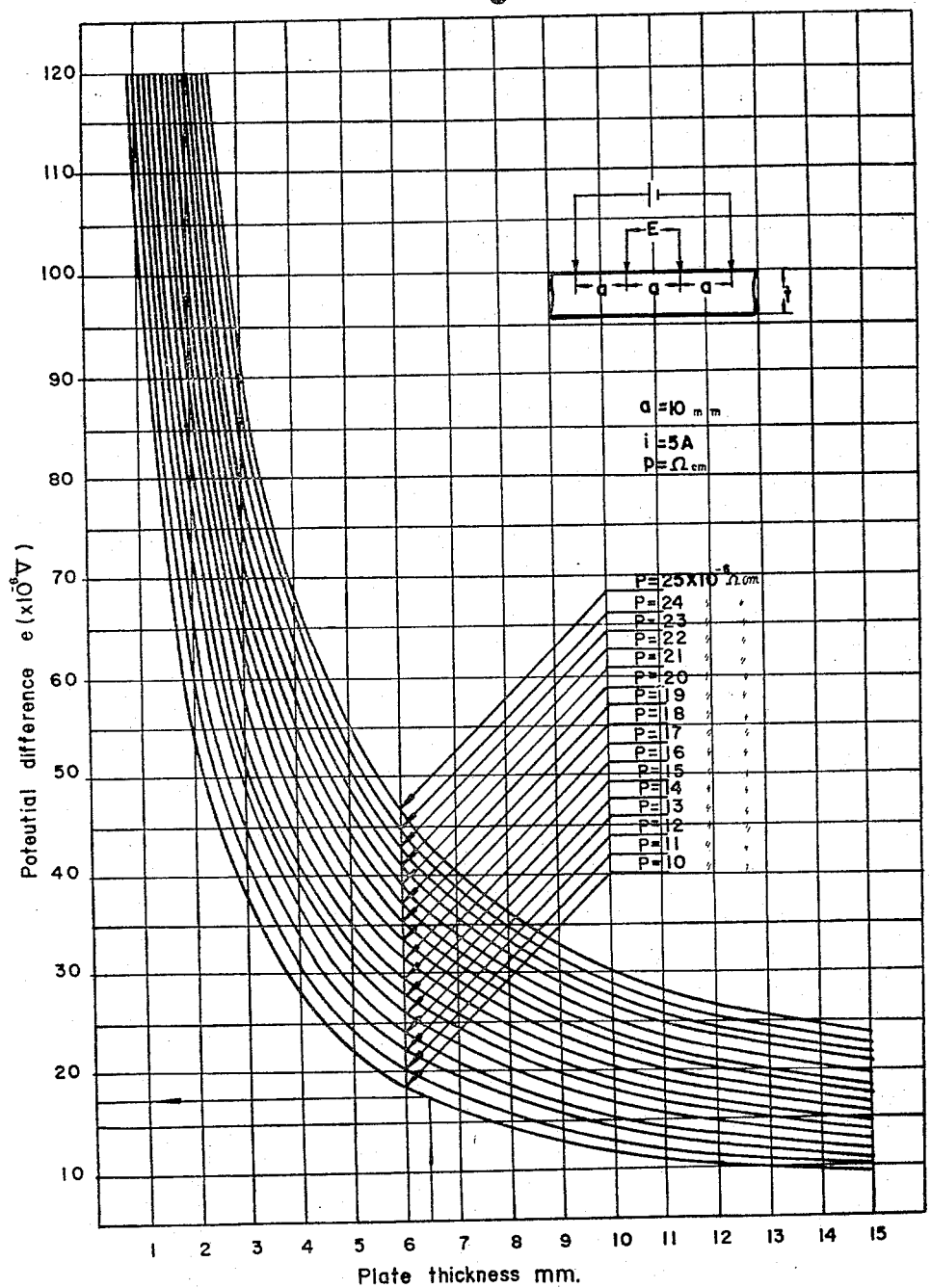
FIGURE 4 is a theoretical diagram showing the relationship between thickness and potential difference between the voltage contacts, in which various measured objects of different specific resistance values are assumed in the form of an endless plate.

Therefore, if $a$ and $i$ are constant, e.g., $a=10$ mm., $i=5$ amperes and $\rho$ is a resistivity of from $10 \times 10^{-6}$ Ω cm. to $25 \times 10^{-6}$ Ω cm., the relationship between the potential difference $e$ and thickness $t$ for the respective $\rho$'s can be expressed by the curves in FIG. 4 from the Formula I.

Figure 2:
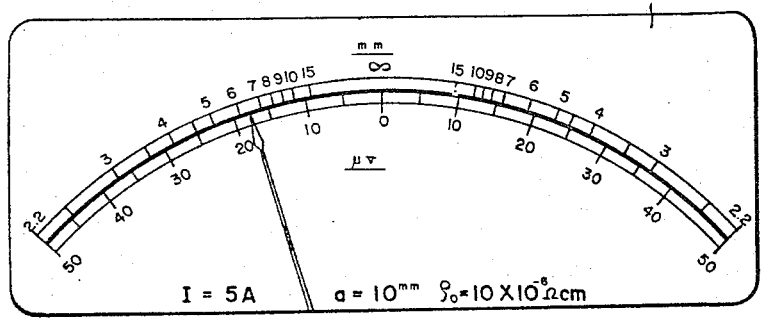
FIGURE 2 is a front view of the thickness indicator of the thickness measuring instrument of FIG. 1.

On the indicator 5 of the instrument, the relative value between the potential difference $e$ ($\mu v$) and thickness $t$ (mm.) for the specific resistance value $\rho o = 10 \times 10^{-6}$ Ω cm. is scaled according to the curve in FIG. 4. Accordingly, as shown in FIG. 2, when the specific resistance value of the object plate is $\rho o$ and the potential difference is 17.5 $\mu v$, the indicator indicates a thickness of 6.5 mm. corresponding to the graph in FIG. 4.

However, the specific resistance value $\rho$ of an object, the thickness of which is to be measured, may vary according to material quality, temperature and other characteristics of the object. Therefore, in order to read the thickness of the measured object 2, for any variation in the specific resistance $\rho$ of the object 2, by means of the voltage indicator 5 which bears the relationship between the potential difference $e$ and the thickness $t$ of the measured object, the specific resistance value of which is $\rho o$, the input voltage of the D.C. amplifier 4 must be attenuated to $\rho o / \rho$ by the variable resistance attenuator 3. Then the relationship between the potential difference $e$ between the voltage contacts L and M and the thickness $t$ will be similar to the case in which the specific resistance takes a special value $\rho o$, and the indicator will show the correct thickness of the object 2 to be measured. Even in case the specific resistance differs from the special value $\rho o$, if the variable resistance attenuator 3 is adjusted, the thickness of the object can be read directly from the scale of the indicator 5.

As above mentioned, since the adjustment of the variable resistance attenuator 3 can be determined corresponding to the specific resistance value of the measured object, various specific resistance values can be scaled in proper positions on the resistance attenuator 3. Since for measuring various materials, the specific resistance values are known, the setting of variable resistance attenuator 3 may be made to correspond with the specific resistance value of the measured object. Consequently, the instrument of the invention is very convenient to use, and, as explained below, it is quite feasible to know the apparent specific resistance value of an object the specific resistance value of which is unknown.

For measuring the thickness of an object the specific resistance value of which is unknown, firstly the thickness at one point of the object is measured without regard to the specific resistance value of the object. As shown in FIG. 5, a pair of current contacts $A_1$ and $A_2$ at central positions, and two pairs of voltage contacts $P_1$, $P_2$ and $P'_1$, $P'_2$ respectively on both sides of the current contacts, are respectively spaced at a certain fixed distance, put in contact with the measured object $2''$ and charged with electricity. The arrangement of the contacts may be altered as desired. The potential difference $E_1$ between $P_1$ and $P_2$ and the potential difference $E_2$ between $P'_1$ and $P'_2$ are then measured. From the value of ratio $E_1/E_2$ between both potential differences, and by using the relative curve in FIG. 6 of $E_1/E_2$ (the ratio potential difference) obtained by preliminary experimental test vs. $t/a$ (the ratio between the thickness and the contact distance between contacts adjacent each other), the value $c$ of $t/a$ is obtained. Then, independent of the specific resistance value of the measured object, the thickness $t$ is obtained by multiplying $c$ by $a$. However, this is the thickness at one point of the measured object $2''$. If the resistance attenuator is adjusted so that the thickness value shown on the scale of the indicator 5 of the thickness measuring instrument, at the same point where the thickness was measured by preliminary experimental test, becomes the same as the thickness value obtained by the preliminary experimental test, the apparent specific resistance value of the measured plate $2''$ in this case is known from the scale previously provided for the variable resistance attenuator 3. The thickness at a desired point can be directly read from the indicator 5 by adjusting the resistance of the variable resistance attenuator 3 according to the ratio between the apparent specific resistance value $\rho$ and the special specific resistance value $\rho o$. Furthermore, the thickness at one point of the measured plate $2''$ may, of course, be measured by any other suitable method besides the above-mentioned one.

The above-mentioned theoretical Formula I is for an endless planar plate, but a similar thickness measurement can be employed for measuring the thickness of a tube or the like. For instance, when the measured object is a tube, the specific resistance value apparently varies in accordance with the relation between the diameter $D$ of the tube and the distance $l$ between the contacts $L$ and $M$, compared with the endless planar plate.

Experimentally, this relation is shown as follows:

$$\frac{\rho}{\rho_0} = 1 + \frac{0.408}{\left(\frac{D}{l}\right)1.883} \quad (II)$$

In this case, $\rho$ is the apparent specific resistance value and $\rho_1$ is the specific resistance value of the measured object in case of an endless planar plate. In the case of the tube, by adjusting the resistance of the variable resistance attenuator 3 according to $\rho/\rho_1$, the thickness can immediately be obtained from the index of the indicator 5.

As will be clear from the aforegoing description, the thickness measuring instrument of the invention can be utilized in the measurement of the corrosion thickness of evaporator tubes, superheater tubes and economizer tubes of boilers, the corrosion thickness of steel hull plates and steel deck plates, the thickness of water turbine casings, water-pressure iron tubes, oxygen bombs and other pressure vessels, and generally in the thickness measurements of other conductive metal plates, metal tubes, etc., without the complicated conversion of various calibration curves into thicknesses. Consequently, measuring efficiency can be greatly improved. Furthermore, by indexing various specific resistances on the variable resistance attenuator, the apparent specific resistance value of the measured object can be obtained at the same time. The present instrument can also be utilized for quality discrimination.

It will be obvious to those skilled in the art that the invention is not limited to the specific construction disclosed herein, but covers all modifications and variations within the scope of the following claims without departing from the spirit of the invention.

What is claimed is:

1. A thickness measuring instrument for measuring the thickness of an electro-conductive object, said instrument comprising a pair of current supplying contacts adapted for being placed in contact with said object to feed current through the same, means for feeding current through said current contacts a pair of voltage measuring contacts adapted for being placed in contact with said object to detect a potential difference in said object due to current flow through the same, a voltage indicating means adapted to indicate said potential difference, and a variable resistance attenuator coupling the voltage contacts and the voltage indicating means, said attenuator having a variable resistance value adapted to correspond to the specific resistance of said object, said voltage indicating means having a thickness scale correlated to a singular value of specific resistance whereby upon adjustment of the resistance of the attenuator to the particular value of specific resistance of the object the thickness values can be directly read on said indicating means, said resistance attenuator being provided with an indexing for indicating varied specific resistance values.

2. A thickness measuring instrument as claimed in claim 1 wherein the voltage measuring contacts are interposed between the current supplying contacts, adjacent contacts being spaced at equal distances.

3. A thickness measuring instrument as claimed in claim 1 wherein the voltage indicating means has a voltage scale which indicates the potential difference between said voltage measuring contacts modified by said attenuator.

4. A method for measuring the thickness of an electro-conductive object, said method comprising applying a pair of current supplying contacts against said object to feed current through the latter, applying a pair of voltage measuring contacts against said object to detect a potential difference which exists between said voltage measuring contacts due to current flow in said object, transmitting the potential difference between said voltage contacts to an indicating device which directly indicates thereon a thickness value for said object assuming such object to have a particular specific resistance, and modifying the potential difference detected by said voltage measuring contacts in correspondence with the specific resistance value of said object as it differs from the first said specific resistance, and indicating directly the modified potential difference as the thickness of said object.

5. A method as claimed in claim 4, wherein the actual specific resistance value of said object is gaged by the degree of modification of said potential difference.

6. A method as claimed in claim 4 comprising spacing the curent and voltage contacts such that adjacent contacts are at equal distances on said object.

7. A method comprising applying a pair of current supplying contacts against an object to feed current through the latter, applying a pair of voltage measuring contacts against said object to detect the potential difference between the latter said contacts due to current flow in said object, said voltage contacts being applied to a portion of said object the thickness of which has previously been measured, indicating potential difference detected by said voltage measuring contacts directly as thickness values, modifying measured potential difference by a particular value to cause the corresponding thickness value which is indicated to equal the previously measured value, and thereafter measuring the thickness of other portions of the object by employing the contacts as hereinabove and directly measuring the thickness values by modifying the resulting potential differences by said particular value by which the first said potential difference was modified.

8. A method as claimed in claim 7 wherein to measure previously the thickness of said object, a pair of current supplying contacts is applied to the object to feed current through the same, two pairs of voltage measuring contacts are applied to said object to measure the potential differences between the respective pairs of voltage measuring contacts, and the thickness of the object is determined by the ratio between the latter said potential differences without resort to the specific resistance value of said object.

9. In a thickness measuring process, a method comprising applying six equally spaced contacts in linear array against an object to be measured, transmitting a current through said object via the two innermost of said contacts, measuring a first potential difference between the next two innermost contacts and a second potential difference between the outermost contacts resulting from said current, and charting ratios of said first and second potential differences for various equal spacings of the contacts against ratios of the thickness of said object and said various spacings.

10. Apparatus comprising four contacts adapted for being applied in rectilinear alignment at equal spacing against a surface of an electrically conductive object the thickness of which is to be measured, means to transmit a predetermined current through said object via the two outermost of said contacts, indicating means to indicate the potential difference occurring at the two innermost of said contacts, the latter said means indicating the potential differences directly as a measurement of the thickness of said object for a particular assumed value of specific resistivity, and attenuating means coupling the indicating means to said innermost contacts to adapt said potential difference to the resistivity of said object, said indicating means having correlated voltage and thickness scales related according to the formula $$e = \frac{\rho i}{2t}\{f(\theta_1) - f(\theta_2)\}$$

wherein $e$ = potential difference between said innermost contacts
$\rho$ = specific resistance value of said object
$\theta_1 = a/2t$
$\theta_2 = a/t$
$a$ = the distance between contacts
$i$ = said predetermined current
$t$ = thickness of the object.

11. Apparatus as claimed in claim 10 where $\rho$ is a predetermined constant.

12. Apparatus as claimed in claim 11 wherein said attenuating means has an index indicating a range of resistivities for which adjustment can be made.

13. A method of measuring the thickness of electroconductive objects having respective specific resistance values comprising contacting a pair of current contacts with a surface of an object whose thickness is to be measured, and feeding current via said contacts to said object, contacting a pair of voltage contacts with the surface of said object at equal distances from respective current contacts, said distances being equal to the distance between the current contacts, transmitting the potential difference between said voltage contacts through a variable resistance attenuator, to an indicating means which indicates directly thereon a thickness value for said object, assuming such object to have a particular specific resistance, and adjusting the resistance value of said variable resistance attenuator to correspond to the specific resistance value of the object as it differs from the assumed resistance.

14. A method of measuring the thickness of electroconductive objects as claimed in claim 13, wherein the specific resistance value corresponding to the value of resistance to which the variable resistance attenuator is adjusted is indicated by indexing means provided on the attenuator.

15. A method of measuring the thickness of electroconductive objects as claimed in claim 13, wherein, when said specific resistance value of an object is unknown, the thickness of a portion of such object is measured, and said voltage contacts are placed in contact with the portion of the measured object in the region where the thickness has already been measured, the resistance of the variable resistance attenuator being adjusted so that said indicating means indicates the measured thickness value whereby the thickness of other portions of the object can be measured with that particular adjustment of the variable resistance attenuator unaltered.

16. A method for measuring the thickness of electroconductive objects as claimed in claim 15, wherein, in order preliminary to measure the thickness of the object in the first said portion, a pair of spaced current contacts is placed in contact with the object to be measured to feed current to said object, two pairs of voltage contacts each of a spacing equal to that of the current contacts are contacted with said object to detect the potential difference between respective paired voltage contacts, the voltage contacts being positioned on the object relative to the current contacts so that said contacts are equally spaced, the thickness of the object being evaluated on the basis of the ratio between both potential differences and the spacing between any one pair of contacts.

References Cited

UNITED STATES PATENTS

| | | | |
|---|---|---|---|
| 1,895,643 | 1/1933 | Putnam | 324—64 |
| 2,094,234 | 9/1937 | Drain | 324—64 |
| 2,476,943 | 7/1949 | Brady | 324—64 |
| 2,502,059 | 3/1950 | Muzzey | 324—64 |
| 2,586,868 | 2/1952 | Scott | 324—64 |
| 2,659,862 | 11/1953 | Branson | 324—64 |
| 2,854,626 | 9/1958 | Davidson et al. | 324—64 |
| 2,994,821 | 8/1961 | Dravnieks | 324—65 |

OTHER REFERENCES

Barry et al.: J. of Scientific Instruments, vol. 39, March 1962, pp. 119–121.

RUDOLPH V. ROLINEC, *Primary Examiner.*

WALTER L. CARLSON, *Examiner.*

C. F. ROBERTS, *Assistant Examiner.*